J. J. OLSEN AND L. E. EDWARDS.
PISTON RING.
APPLICATION FILED APR. 17, 1920.
1,366,209.
Patented Jan. 18, 1921.
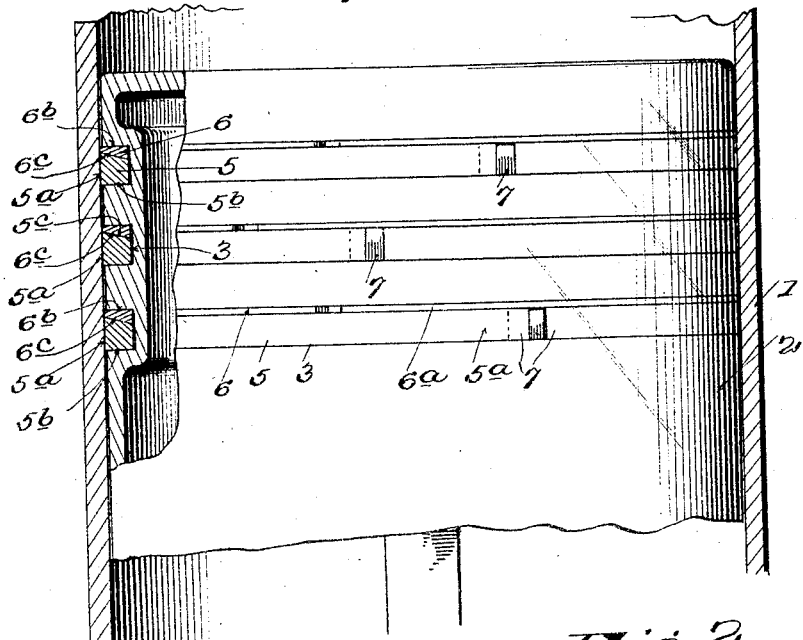
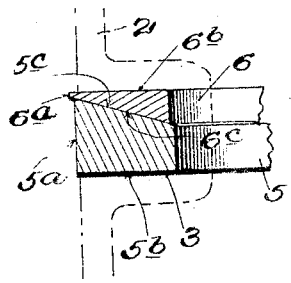
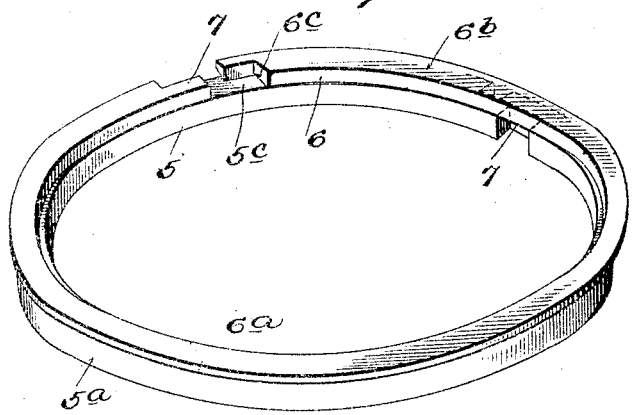
J. J. Olsen and L. E. Edwards, INVENTORS.
BY
ATTORNEY.

UNITED STATES PATENT OFFICE.

JENS J. OLSEN AND LEWIS E. EDWARDS, OF SAN ANTONIO, TEXAS.

PISTON-RING.

1,366,209.  Specification of Letters Patent.  Patented Jan. 18, 1921.

Application filed April 17, 1920. Serial No. 374,521.

*To all whom it may concern:*

Be it known that we, JENS J. OLSEN and LEWIS E. EDWARDS, citizens of the United States of America, and both residents of San Antonio, Bexar county, and State of Texas, have invented certain new and useful Improvements in Piston-Rings, of which the following is a specification.

This invention relates to certain improvements in piston rings; and the objects and nature of the invention will be readily understood by those skilled in the art in the light of the following explanation of the accompanying drawings illustrating what we now believe to be the preferred mechanical expression or embodiment of our invention from among other forms, constructions and arrangements within the spirit and scope thereof.

An object of the invention is to provide certain improvements in piston rings with the ends in view of reducing to the minimum possibility of so-called lateral leakage through the piston groove and behind the rings or from ring to ring and through the joints in the rings, and of providing exceedingly simple and easily applied means composed of a minimum number of parts for accomplishing said result.

With these and other objects in view, the invention consists in certain novel features in construction and in combinations and arrangements as more fully and particularly set forth and specified hereinafter.

Referring to the accompanying drawings:—

Figure 1, shows an internal combustion engine cylinder in longitudinal section and a piston therein equipped with piston rings of our invention and shown partially in section.

Fig. 2 shows in perspective a pair of our coöperating piston rings separated from the piston and cylinder and consequently in expanded condition.

Fig. 3, is a detail section, showing the auxiliary ring in its normal expanded condition with respect to the major ring, dotted lines indicating the piston groove.

In the drawings, we somewhat diagrammatically illustrate any suitable cylinder 1, such as an internal combustion engine cylinder, containing any suitable reciprocating piston 2 provided with one or more circumferential piston ring grooves 3 of the ordinary or any other suitable formation. The piston rings of our invention are designed to occupy such grooves, and, in the example illustrated, each consists of a set or pair of coöperating suitable spring metal rings. Each such set, consists of a relatively large, heavy or major ring 5, and a relatively small, light or auxiliary ring 6. Each ring is of the split expansion spring or tension type with its ends 7 of any desirable formation to overlap and provide a suitable joint. Usually, the tension of each ring is such that when released from the compressing or confining influence of the cylinder, the ring assumes its normal expanded position or condition with its ends 7 spaced a distance apart approximately as shown in Fig. 2, although we do not wish to so limit our invention.

The major ring or section 5 of a set is formed with a cylindrical circumferential cylinder-wall bearing surface $5^a$, an annular wide flat end face $5^b$, and a tapered, beveled or conical opposite end annular face $5^c$. The face $5^c$ is beveled or tapered throughout the radial thickness of the ring from the inner cylindrical surface of the ring to the outer cylindrical surface thereof with an outward flare so that the length (thickness) of the ring longitudinally of the piston is greater at the circumference (outer edge) of the ring than at the inner cylindrical surface (inner edge) of the ring. The small or auxiliary ring 6 is relatively short (thin) longitudinally of the piston with respect to the major ring, and is formed with wide annular end face $6^b$, circumferential cylindrical cylinder-wall-bearing surface $6^a$ and beveled, tapered or conical annular end face $6^c$, bearing against and of the same angle approximately as the major ring face $5^c$. The face $6^c$ extends throughout the radial thickness of ring 6 with an inward flare (the opposite flare to that of face $5^c$) so that the ring 6 is relatively narrow at its bearing surface $6^a$ and relatively thick at its inner edge.

In the particular embodiment illustrated, where one set of rings occupies a piston groove, the flat face $5^a$ of the major ring seats against one end (radial) wall of the groove, and the flat face $6^b$ of the auxiliary ring seats against the other end wall of the groove with the oppositely flared end faces of the two rings abutting, and the outer annular edges $5^a$, $6^a$, of the two rings forming the uniform-diameter cylindrical circumference of the set and providing the cylinder bearing surface of the set.

The relatively-light or small ring 6 has a greater normal diameter than the major or relatively heavy ring, and hence is contracted a greater distance from normal than is the major ring, and is under excessive expansive pressure with respect to the major ring, when said rings are compressed in the cylinder.

When the set of rings is compressed within the cylinder, the auxiliary ring under its constant excessive tendency to expand, acts as a wedge in tending to expand the set of rings laterally (longitudinally of the piston) and thereby forcing the flat faces $5^b$, $6^b$ of the set approximately tightly against the adjacent flat walls of the piston groove to reduce leakage through said groove to the minimum.

When the two rings of a set are held under compression by the cylinder walls with the "lateral" (the looseness between the ring faces $5^b$, $6^b$ and the respective adjacent side walls of the piston groove) fully taken up by the lateral (longitudinally of the piston) expansion of the ring set under action of the cam faces $6^c$, $5^c$, the excessive tension of the auxiliary ring tends to slightly increase the radial pressure of the major ring against the cylinder walls. The diameter of the auxiliary ring surface $6^a$ then is the same as the diameter of the major ring surface $5^a$.

In use, a set of rings is subject to a constant lateral wear. The lateral wear is longitudinally of the piston at the faces $5^b$, $6^b$, and the engaging groove walls. The auxiliary ring constantly expands to take up the lateral wear and when so expanding is subjected to excessive radial wear (with respect to radial wear of the major ring at its relatively wide surface $5^a$) at its relatively thin or narrow surface $6^a$. When so expanding radially to take up lateral wear, the radial pressure of the auxiliary ring on the major ring is somewhat lessened.

However, the angle of the tapered faces $5^c$, $6^c$ is slight (usually somewhere about fifteen to twenty degrees), being intended merely to constantly maintain the desired tight fit between the tapered faces $5^c$, $6^c$, and between the flat ring faces $5^b$, $6^b$ and the adjacent groove walls, under the excessive expansive force of the relatively light auxiliary ring. The two rings constantly expand as they wear radially and laterally, and when the rings have expanded to almost normal (internal diameter) with their ends 7 approximately separated they will cease to exert proper tension against the cylinder walls and should be renewed.

In a set of rings the joints of the two rings are out of alinement longitudinally of the piston, and in applying the set to a piston groove, the auxiliary ring is inserted in the groove and then the major ring. Where the piston groove is of excessive width, two or more of our sets of rings can be employed in the one groove and adjoining flat faces of the sets will be held in tight engagement by the wedging faces within each set.

It it evident that various changes, modifications and variations might be resorted to without departing from the spirit and scope of our invention and hence we do not wish to limit ourselves to the exact disclosure hereof.

What we claim is:

1. A piston ring set composed of a split spring major ring of uniform radial width from end to end, and a coöperating split spring relatively light auxiliary ring of uniform radial width from end to end, said auxiliary ring of greater normal diameter than the major ring and having a relatively narrow cylinder bearing surface, said rings having flat faces at the ends of the set and oppositely tapered faces abutting throughout their radial width.

2. A piston ring set consisting essentially of a split spring major ring having a cylinder bearing surface, a flat end face and a slightly tapered end face, and a relatively thin split spring auxiliary ring of greater normal diameter than said major ring and having an oppositely tapered end face complementary to and fitting and abutting said tapered face of the major ring throughout the radial width thereof, a flat end face and a cylinder bearing surface that is relatively narrow with respect to said bearing surface of the major ring.

3. A set of split spring piston rings having tapered faces abutting throughout their radial width and formed and arranged to constantly tend to expand the set laterally under the expansive force of one of the rings, each ring having a circumferential cylinder bearing surface, said surfaces being of the same diameter when the rings are compressed in the cylinder, one of said cylinder bearing surfaces being relatively thin, the ring having said thin bearing surface being relatively small and under greater compression when in the cylinder than said other ring and formed to exert radial pressure on the relatively large ring.

JENS J. OLSEN.
LEWIS E. EDWARDS.